United States Patent
Muramatsu et al.

(10) Patent No.: US 6,808,168 B2
(45) Date of Patent: Oct. 26, 2004

(54) FLUID-FILLED ACTIVE VIBRATION DAMPING DEVICE

(75) Inventors: Atsushi Muramatsu, Komaki (JP); Hiroyuki Ichikawa, Kani (JP)

(73) Assignee: Tokai Rubber Industries, Ltd., Komaki (JP)

( * ) Notice: Subject to any disclaimer, the term of this patent is extended or adjusted under 35 U.S.C. 154(b) by 39 days.

(21) Appl. No.: 10/235,186

(22) Filed: Sep. 4, 2002

(65) Prior Publication Data

US 2003/0057620 A1 Mar. 27, 2003

(30) Foreign Application Priority Data

Sep. 5, 2001 (JP) ........................................ 2001-268355

(51) Int. Cl.$^7$ .......................... F16F 13/00; F16M 15/00; F16M 9/00; F16M 11/00; F16M 5/00
(52) U.S. Cl. .............................. 267/140.13; 267/64.14; 267/64.28; 267/140.2
(58) Field of Search .............................. 267/195, 217, 267/218, 299, 292, 294, 64.11, 64.13, 64.14, 64.28, 140.11, 140.13, 140.12, 440.14, 140.15, 140.2

(56) References Cited

U.S. PATENT DOCUMENTS

| | | | | |
|---|---|---|---|---|
| 4,546,960 A | * | 10/1985 | Abrams et al. ............. | 267/136 |
| 4,886,252 A | * | 12/1989 | Haussermann ......... | 267/140.13 |
| 5,092,566 A | * | 3/1992 | Freudenberg .......... | 267/140.14 |
| 5,145,156 A | * | 9/1992 | Muramatsu et al. ... | 267/140.14 |
| 5,167,403 A | * | 12/1992 | Muramatsu et al. ... | 267/140.13 |
| 5,170,998 A | * | 12/1992 | Muramatsu ............ | 267/140.13 |
| 5,180,148 A | * | 1/1993 | Muramatsu ............ | 267/140.14 |
| 5,217,211 A | * | 6/1993 | Ide et al. ............... | 267/140.13 |
| 5,246,212 A | * | 9/1993 | Funahashi et al. ..... | 267/140.13 |
| 5,314,173 A | * | 5/1994 | Ide et al. ............... | 267/140.14 |
| 5,632,472 A | * | 5/1997 | Kato et al. ............. | 267/140.13 |
| 5,992,833 A | * | 11/1999 | Tanahashi .............. | 267/140.14 |
| 6,010,120 A | * | 1/2000 | Nagasawa .............. | 267/140.14 |
| 6,082,718 A | * | 7/2000 | Yamada et al. ........ | 267/140.14 |
| 6,176,477 B1 | * | 1/2001 | Takeo et al. ........... | 267/140.11 |
| 6,206,351 B1 | * | 3/2001 | Hamada et al. ........ | 267/140.14 |
| 6,412,760 B2 | * | 7/2002 | Shimoda et al. ....... | 267/140.13 |
| 6,523,816 B1 | * | 2/2003 | Gastineau et al. ..... | 267/140.14 |
| 6,527,260 B2 | * | 3/2003 | Takeo et al. ........... | 267/140.11 |

FOREIGN PATENT DOCUMENTS

| | | | |
|---|---|---|---|
| EP | 1036952 | * | 9/2000 |
| JP | 11-241749 | | 2/1998 |
| JP | 11-82611 | | 3/1999 |
| JP | 11-201220 | | 7/1999 |
| JP | 2000-356240 | | 12/2000 |
| JP | 200190772 | * | 4/2001 |

* cited by examiner

Primary Examiner—Robert A. Siconolfi
Assistant Examiner—Devon Kramer
(74) Attorney, Agent, or Firm—Beyer Weaver & Thomas, LLP (57) ABSTRACT

Disclosed is a fluid-filled active vibration damping device including: an elastic body; a primary fluid chamber partially defined by the elastic body; a movable member partially defining the primary fluid chamber on one side and a working air chamber on the other side; and a vacuum pump including an air intake port and an exhaust port, which are connectable to the working chamber via a valve mechanism. A fluid pressure variation in the primary fluid chamber can be actively controlled by transmitting an air pressure variation in the working air chamber to the primary fluid chamber via the movable member. A switching operation of the valve mechanism selectively applies a negative pressure generated in the air intake port and a positive pressure generated in the exhaust port to the working air chamber in order to generate the air pressure variation in the working air chamber.

17 Claims, 6 Drawing Sheets

FLUID-FILLED ACTIVE VIBRATION DAMPING DEVICE

INCORPORATED BY REFERENCE

The disclosure of Japanese Patent Application No. 2001-268355 filed on Sep. 5, 2001 including the specification, drawings and abstract is incorporated herein by reference in its entirety.

BACKGROUND OF THE INVENTION

1. Field of the Invention

The present invention relates generally to a fluid-filled active vibration damping device, which has a primary fluid chamber filled with a non-compressible fluid, and which is capable of actively offsetting or reducing vibrations applied to the primary fluid chamber by controlling a fluid pressure in the primary fluid chamber. More particularly, the present invention is concerned with such a fluid-filled active vibration damping device that is suitably applicable to an active elastic mount and an active dynamic damper or oscillator for use in automotive vehicles.

2. Description of the Related Art

Vibration damping devices have been used for damping or isolating vibrations (including noises induced by the vibrations) of a subject member such as a body of an automotive vehicle or other members suffering from these vibrations or noises. Known examples of such vibration damping devices include a vibration damping coupling or mount, e.g., an engine mount, which is interposed between the subject member and a vibration source, e.g., a power unit, so as to connect these two members in a vibration damping fashion for eliminating or reducing a vibration transmitted from the vibration source to the subject member; and a vibration damper that is fixed to the subject member for absorbing or reducing the vibration of the subject member.

A fluid-filled active vibration damping device has been proposed as one type of such vibration damping devices, as disclosed in JP-A-11-82611, JP-A-11-201220, JP-A-2000-356240. The known fluid-filled active vibration damping devices include: an elastic body elastically deformed due to vibrational loads applied thereto; a primary fluid chamber partially defined by the elastic body and an elastically displaceably movable member, while being filled with a non-compressible fluid; and a working air chamber formed on one side of the movable member that is remote from the other side on which the primary fluid chamber is formed. The pressure of the fluid in the primary fluid chamber varies due to the elastic deformation of the elastic body upon application of the vibrational loads to the elastic body, and is also actively controllable by applying a suitable air pressure variation to the working air chamber from the external area, which is transmitted to the primary fluid chamber via the movable member. Such a known fluid-filled active vibration damping device is capable of actively controlling a fluid pressure variation induced in the primary fluid chamber by applying an air pressure variation corresponding to a vibration to be damped, thereby exhibiting an active vibration damping effect or an offsetting effect with respect to vibrations excited in the subject member to which the fluid-filled active vibration damping device is installed.

Generally, the known fluid-filled active vibration damping device utilizes as a vacuum source a negative pressure available from an air intake port of an internal combustion engine, as discussed in the above-indicated documents, and the negative pressure of the vacuum source and the atmospheric pressure is alternately applied to the working air chamber for thereby inducing the air pressure variation in the working air chamber.

For ensuring the known fluid-filled active vibration damping device to exhibit an excellent damping effect with respect to vibrations to be damped, it is required to generate the air pressure variation whose magnitude corresponds to the magnitude of the vibrations to be damped. To meet this requirement, it has been studied to regulate the magnitude of the negative pressure transmitted from the negative pressure source to the working air chamber in an attempt to suitably regulate a range of air pressure variation extending between the atmospheric pressure and a given negative pressure, based on the actual magnitude of the vibrations excited in the subject member, which may be detected by means of an accelerator sensor or the like, or alternatively may be estimated according to a predetermined data map or the like. Namely, it has been considered to regulate the magnitude of the negative pressure applied to the working air chamber so as to generate the air pressure variation induced in the working air chamber, whose magnitude corresponds to that of vibrations excited in the subject member.

However, further extensive studies conducted by the present inventors reveals that when the level of the negative pressure is made higher (i.e., an absolute value of the negative pressure is increased), and the resultant air pressure variation induced in the working air chamber ranges from the atmospheric pressure to a relatively high level of the negative pressure, undesirable air pressure variation as a subordinate frequency component, which does not correspond to the vibrations to be damped, is prone to occur in the working air chamber, and undesirably is transmitted to the primary fluid chamber. This results in deterioration of the vibration damping characteristics of the fluid-filled active vibration damping device.

In addition, when the level of the negative pressure generated in the negative pressure source is made higher and the resultant air pressure variation induced in the working air chamber ranges over a wide negative pressure region, an amount of elastic deformation of the movable member is excessively increased, possibly deteriorating durability of the movable member.

SUMMARY OF THE INVENTION

It is therefore an object of the present invention to provide a fluid-filled active vibration damping device, which is novel in construction, and which is capable of inducing an air pressure variation having a large magnitude in an working air chamber, while preventing undesirable occurrence of an air pressure variation at a subordinate frequency range in the working air chamber.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled active vibration damping device including: an elastic body elastically deformed due to vibrational loads applied thereto, a primary fluid chamber partially defined by the elastic body and filled with a non-compressible fluid; a movable member being elastically displaceable and partially defining the primary fluid chamber on one of opposite sides thereof; a working air chamber disposed an other of opposite sides of the movable member, which is remote from the primary fluid chamber; and a vacuum pump including an air intake port and an exhaust port that are connected to the working air chamber via a valve mechanism, wherein a fluid pressure variation in the primary fluid chamber is induced by an elastic deformation of the elastic body while being actively controlled by transmitting an air pressure variation applied to the working air chamber from an external area to the primary fluid chamber via the movable member, and wherein the valve mechanism is operable to perform a switching operation thereof for selectively applying a negative pressure generated in the air intake port and a positive pressure generated in the exhaust port to the working air chamber in order to generate the air pressure variation in the working air chamber.

In the fluid-filled active vibration damping device according to the present invention, the negative pressure generated in the air intake port of the vacuum pump and the positive pressure generated in the exhaust port of the vacuum pump are both utilized, namely, are selectively applied to the working air chamber. As a result, the air pressure variation induced in the working air chamber can range over the both sides of the atmospheric pressure, i.e., the negative pressure side and the positive pressure side located on the both sides of the atmospheric pressure as a central value of a range of the air pressure variation induced in the working air chamber, making it possible to induce the air pressure variation having a relatively large magnitude in the working air chamber, efficiently.

In the present mode of the invention, the air pressure induced in the working air chamber is arranged to vary across the opposite sides of the atmospheric pressure, namely, between a given negative pressure value and a given positive pressure value. This arrangement allows the movable member to be displaced more likely in a linear region where the movable member shows linear characteristics in a relationship between the applied load and the resultant spring constant of the movable member, rather than in a non-linear region where the movable member shows non-linear characteristics in the same relationship, in comparison with the case where the air pressure induced in the working air chamber varies between the atmospheric pressure and a given negative pressure value, even if these air pressure variations have the same magnitude. That is, the present arrangement prevents or minimizes the undesirable generation of the air pressure variation at a subordinate frequency range in the working air chamber, while making it possible to apply a relatively large magnitude of air pressure variation to the working air chamber. Thus, the fluid-filled active vibration damping device is capable of exhibiting an excellent vibration damping effect with respect to vibrations having a relatively large energy.

Moreover, the fluid-filled vibration damping device of the present mode of the invention includes the air pressure source adapted to apply air pressures to the working air chamber. This arrangement eliminates a need for utilizing a negative pressure available from an air intake system of the engine mount of an automotive vehicle, even if the fluid-filled active vibration damping device of the present invention is used in an automotive vehicle, making it possible to simplify the structure of an air conduit or an air piping system and to increase a degree of freedom in designing the conduit. Also, the present mode of the invention can provide a unit of a fluid-filled active vibration damping device equipped with an air source.

Any known vacuum pump may be employed as long as it is capable of generating a negative and a positive pressure of required level. Examples of the known vacuum pumps include a diaphragm type vacuum pump, a rocking piston type vacuum pump, a direct drive rotary vacuum pump, a sliding vane type vacuum pump, a scroll vacuum pump, a turbo type vacuum pump, a mechanical booster pump. In particular, the employable vacuum pump may be primary adapted to generate a negative pressure, or alternatively may be primary adapted to generate a positive pressure Various kinds of known air pressure pumps capable of generating a positive and a negative pressure as a result of an intake and an exhaust of air, may be employed as the vacuum pump in the vibration damping device of this mode of the invention. Similarly, any known valve mechanism may be employed as long as it is capable of alternately applying the negative pressure and positive pressure to the working air chamber. For instance, the valve mechanism may be constituted by a three-way valve that is operable to alternately connect the air intake port and the exhaust port of the vacuum pump to the working air chamber, or alternatively constituted by a plurality of valves, e.g., a first shutoff valve that is operable for connecting and disconnecting the working air chamber to and from the air intake port of the vacuum pump, and a second shutoff valve that is operable for connecting and disconnecting the working air chamber to and from the exhaust port of the vacuum pump.

(2) A fluid-filled active vibration damping device according to the above-indicated mode (1), wherein the working air chamber is connectable to the atmosphere via the valve mechanism, and the negative pressure generated in the air intake port, the positive pressure generated in the exhaust port and an atmospheric pressure in the atmosphere are selectively applied to the working air chamber based on the switching operation of the valve mechanism. This arrangement makes it possible to connect the working air chamber to the atmosphere as needed, for regulating the air pressure in the working air chamber, or alternatively for renewing the air pressure in the working air chamber to the atmospheric pressure, and makes it possible to select the pressure sources to be connected to the working air chamber, depending upon required vibration damping characteristics. For instance, the air pressure in the working air chamber may vary between the atmospheric pressure and a given negative pressure, or alternatively between the atmospheric pressure and a given positive pressure, depending upon the required vibration damping characteristics. Thus, the fluid-filled active vibration damping device can enjoy a far freedom in setting vibration damping characteristics thereof.

(3) A fluid-filled active vibration damping device according to the above-indicated mode (1) or (2), further comprising a negative pressure tank connected to a portion of an air conduit located between the air intake port of the vacuum pump and the valve mechanism, and a positive pressure tank connected to another portion of the air conduit located between the exhaust port of the vacuum pump and the valve mechanism. In the fluid-filled active vibration damping device constructed according to the present mode of the invention, the air pressure, i.e., the negative and the positive pressure generated in the vacuum pump is applied to the working air chamber via the negative and the positive pressure tank, respectively. This arrangement reduces or eliminates minute variations possibly induced in the negative and positive pressure generated in the vacuum pump due to the operation of the vacuum pump, thus making it possible to control air pressures applied to the working air chamber with high preciseness.

(4) A fluid-filled active vibration damping device according to any one of the above-indicated modes (1)–(3), further comprising a valve controller for controlling operation of the valve mechanism such that the valve mechanism alternately connects the working air chamber to the negative pressure generated in the air intake port and the positive pressure generated in the exhaust port at a frequency corresponding to that of vibrations to be damped, for generating the air pressure variation in the working air chamber. In this mode of the invention, the valve controller may be embodied by utilizing a known control device in which a signal detected from an accelerator sensor fixed to the subject member whose vibrations to be damped, or a signal corresponding to vibrations to be damped, e.g., an ignition pulse signal of the internal combustion engine, is utilized as a frequency reference signal, or a reference signal, for determining a phase of the switching operation of the valve mechanism with respect to the reference signal, based on a transfer function estimated on the basis of data of actual measurements of transfer function in advance, and the phase of the switching operation of the valve mechanism is controlled in a feedback fashion.

(5) A fluid-filled active vibration damping device according to any one of the above-indicated modes (1)–(4), wherein the vacuum pump comprises a vacuum pump of electromagnetically operated type, the vibration damping device further comprising: a pump output control device adapted to regulate an output of the vacuum pump of electromagnetically operated type depending upon magnitude of vibrations to be damped. In this mode of the invention, any known vacuum pumps indicated above with respect to the mode (1) of the invention, may be employed as long as it is operated by means of an electric motor. Preferably, a motor driven vacuum pump in which an electric motor is incorporated and an output of the electric motor is directly electrically controllable, may be employed. The pump output control device may be effectively embodied by utilizing a known control device, in which an output is controlled in a feedback or a feedforward fashion on the basis of a signal detected from an accelerator sensor fixed to the subject member for detecting a level of vibration excited in the subject member, or a signal obtained based on a predetermined operation formula or a data map that is prepared for estimating the excited vibration level from the operating condition of the internal combustion engine on the basis of a relationship between the operation condition of the internal combustion engine as a vibration source and the level of vibrations excited in the subject member, which were measured in advance.

(6) A fluid-filled active vibration damping device according to any one of the above-indicated modes (1)–(5), further comprising a pump synchronizing control device adapted to regulate a frequency and a phase of a variation of air pressure generated from the vacuum pump according to a frequency and a phase of the vibrations to be damped. While the vacuum pump is likely to suffer from a problem of generation of undesirable variation of generating pressure, like pulsations, this mode of the invention makes it possible to positively utilize the pulsation-like variation of the air pressure generated from the vacuum pump to improve damping capacity of the fluid-filled active vibration damping device. For instance, where the valve mechanism is controlled to be operated to generate in the working air chamber the air pressure variation whose frequency and phase correspond to those of vibrations to be damped, the variation of the air pressure generated from the vacuum pump may be adjusted in terms of its frequency and phase with respect to a frequency of subordinate vibrations, such as higher harmonics vibrations, which are prone to be derived from the primary vibrations to be damped. This arrangement enables the fluid-filled active vibration damping device to exhibit an excellent damping effect with respect to higher harmonics vibrations, although it is difficult to damp higher harmonics vibrations by simply controlling the operation of the valve mechanism.

(7) A fluid-filled active vibration damping device according to any one of the above-indicated modes (1)–(6), wherein the primary fluid chamber includes a pressure receiving chamber partially defined by the elastic body and an oscillating chamber partially defined by the movable member, the pressure receiving chamber and the oscillating chamber are held in fluid communication with each other via an orifice passage. In the fluid-filled active vibration damping device according to this mode of the invention, the fluid pressure variation induced in the oscillating chamber as a result of the displacement of the movable member is transmitted to the pressure receiving chamber through the orifice passage. With the help of resonance of the fluid flowing through the orifice passage, the fluid pressure variation induced in the oscillating chamber can be effectively transmitted to the pressure receiving chamber, thus making it possible to cause in the pressure receiving chamber a fluid pressure variation whose magnitude is made larger than that of the air pressure variation induced in the working air chamber.

(8) A fluid-filled active vibration damping device according to any one of the above-indicated modes (1)–(7), further comprising: a flexible layer partially defining an auxiliary fluid chamber being independent of the primary fluid chamber and filled with the non-compressible fluid; and a fluid passage for permitting a fluid communication between the primary fluid chamber and the auxiliary fluid chamber. According to this mode of the invention, when the elastic body is elastically deformed, the pressure of the fluid in the primary fluid chamber increases, causing flows of the non-compressible fluid through the fluid passage based on the pressure difference between the primary fluid chamber and the auxiliary fluid chamber. With the help of resonance of the fluid flowing through the fluid passage, the fluid-filled active vibration damping device can exhibit passive vibration damping device with respect to vibrations whose frequency is held within a frequency band to which the fluid passage is tuned. For assuring the passive damping effect owing to resonance of the fluid flowing through the fluid passage with high efficiency, a resonance frequency of the fluid flowing through the fluid passage, in other words, a frequency of vibration to be damped with the help of the passive damping effect based on resonance of the fluid-flowing through the fluid passage, is set to a frequency band that is lower than a frequency of vibration to be damped with the help of active damping effect based on displacement of the movable member.

(9) A fluid-filled active vibration damping device according to any one of the above-indicated modes (1)–(8), further comprising a first mounting member and a second mounting member that are elastically connected with each other via the elastic body, wherein the first mounting member is adapted to be attached to a vibrative member and the second mounting member is adapted to be attached to a subject member whose vibrations to be damped so that the vibration damping device is interposed between the vibrative member and the subject member for elastically connecting the vibrative member and the subject member in a vibration damping fashion. The fluid-filled active vibration damping device according to this mode of the invention can effectively provide vibration-damping devices for use in an automotive vehicle, such as an engine mount, a differential mount, a body mount, a suspension mount and a suspension bushing.

(10) A fluid-filled active vibration damping device according to any one of the above-indicated modes (1)–(9), further comprising a support member and a mass member that are elastically connected with each other via the elastic body, the support member being adapted to attached to the subject member whose vibrations to be damped such that the mass member is elastically supported by the subject member via the elastic body In the fluid-filled active vibration damping device constructed according to this mode of the invention, the elastic body as a spring component and the mass member as a mass component cooperate to form one vibration system. An application of the air pressure variation to the working air chamber oscillates this vibration system, and the resonance of this vibration system is effectively utilized to apply an oscillating force corresponding to the vibrations to be damped to the subject member, so that an active vibration damper capable of offsetting or actively damping vibrations is effectively provided.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
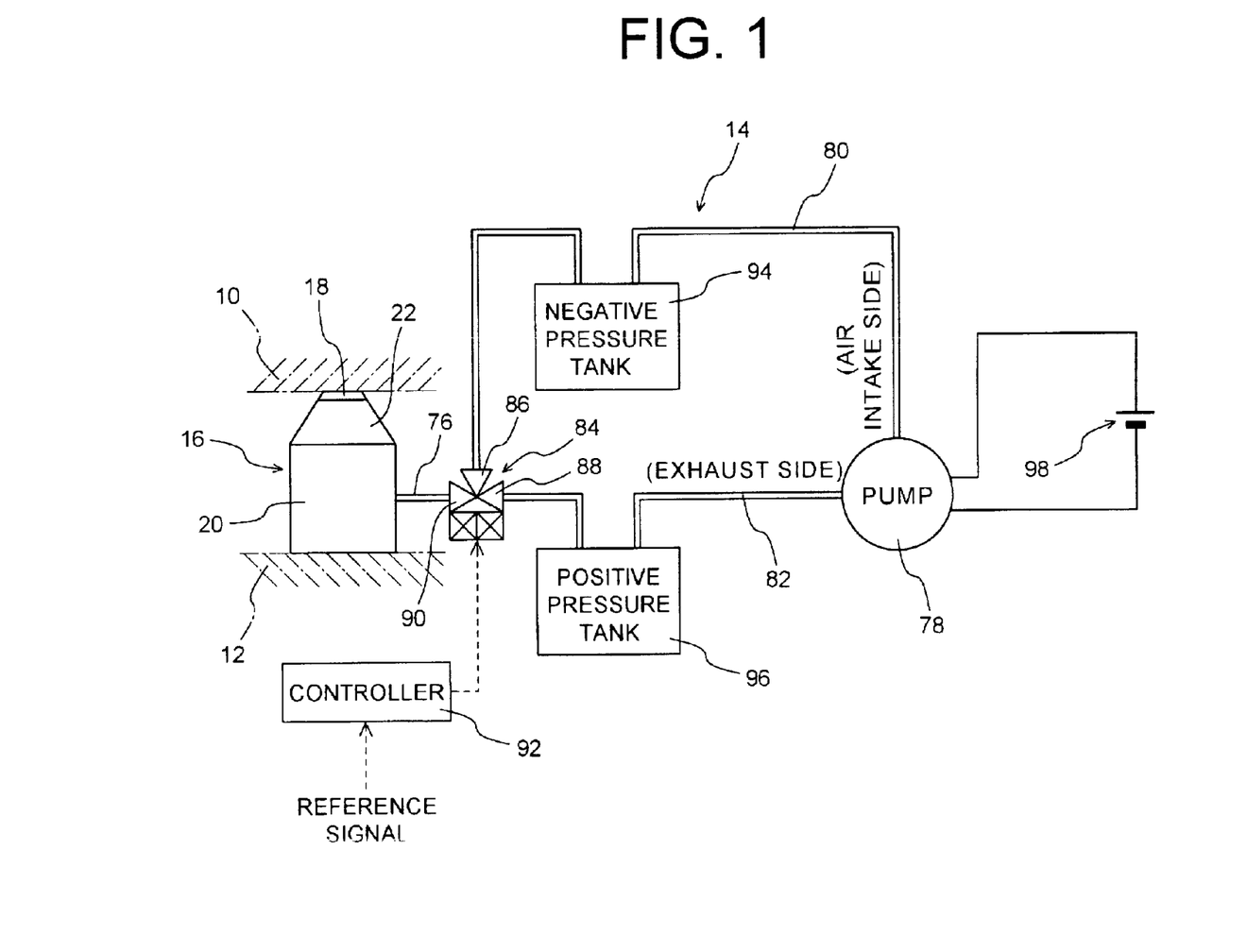
FIG. 1 is a diagram schematically illustrating a fluid-filled active vibration damping device in the form of an engine mount constructed according to a first embodiment of the present invention.

Referring first to FIG. 1 showing a first embodiment of the present invention in the form of an engine mount 14 of a supporting system for supporting a power unit of an automotive vehicle, reference numeral 10 denotes a power unit incorporating an internal combustion engine, a transmission and the like. The power unit 10 is flexibly supported on a body 12 of the vehicle via a plurality of engine mounts, in a vibration damping fashion. The engine mount 14 constructed according to the present embodiment may be used as at least one of these engine mounts. In the following description, the vertical direction is basically oriented in the vertical direction as seen in FIGS. 1 and 2.

Figure 2:
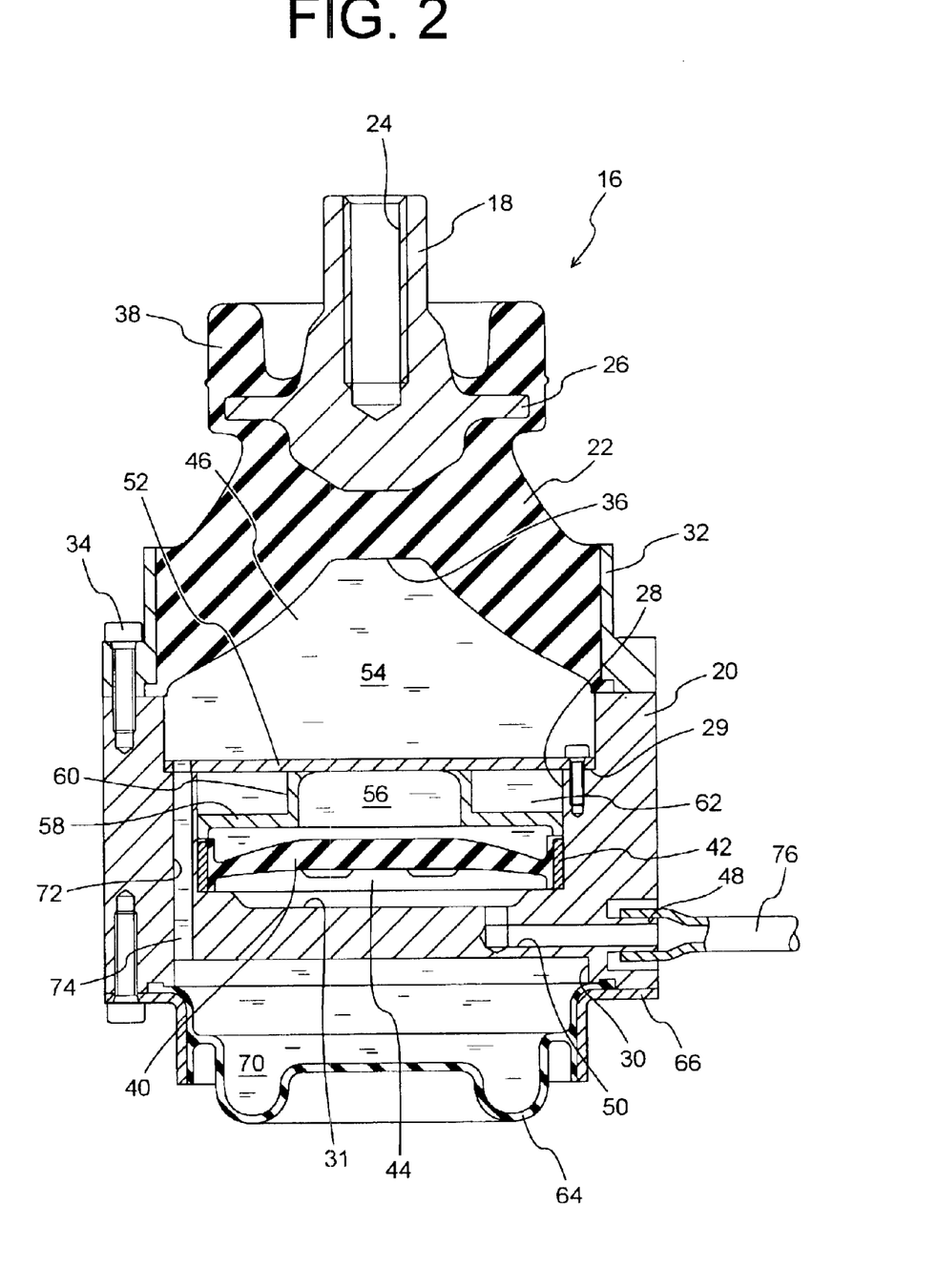
FIG. 2 is an elevational view in axial or vertical cross section of a mount body used in the engine mount of FIG. 1.

FIG. 2 illustrates more specifically an example of a mount body 16 of the engine mount 14 according to the present invention shown in FIG. 1. The mount body 16 includes a first mounting member 18, a second mounting member 20, and a rubber elastic body 22 interposed between the first and second mounting members 18, 20 for elastically connecting these two mounting members 18, 20. The first mounting member 18 is a metallic rod having a circular shape in cross section, and has a tapped hole 24 open in its upper end face. An annular stop plate 26 is integrally formed at an axially intermediate portion of the first mounting member 18 so as to extend radially outwardly. The first mounting member 18 is firmly fixed to the power unit 10 by means of a bolt (not shown) threaded into the tapped hole 24.

The second mounting member 20 is a disk shaped metallic member having a relatively large diameter and thickness. The second mounting member 20 has an upper circular recess 28 open in a central portion of its upper end face, and a lower circular recess 30 open its lower end face. The upper circular recess 28 has a depth dimension that is made larger than that of the lower circular recess 30, and that is made larger at its radially inner portion rather than its radially outer portion.

The second mounting member 20 is elastically connected at its axially upper end portion with the first mounting member 18 via the rubber elastic body 22 interposed therebetween. The rubber elastic body 22, in its entirety, has a generally truncated conical shape with a relatively large diameter, and is bonded at its small diameter end portion to the first mounting member 18 and at an outer circumferential surface of its large diameter end portion to an inner circumferential surface of a large-diameter hollow-cylindrical metallic coupling member 32 such that the metallic coupling member 32 is disposed radially outward on the rubber elastic body 22, when a rubber material for forming the rubber elastic body 22 is vulcanized The metallic coupling member 32 is superposed on an axially upper end face of the second mounting member 20, and fixed to the second mounting member 20 by means of a suitable fastening means, e.g., a plurality of bolts. As a result, the large diameter end portion of the rubber elastic body 22 is fixed to the second mounting member 20, such that the first and second mounting members 18, 20 are disposed coaxially with each other with a suitable axial spacing therebetween. Namely, the first and second mounting members 18, 20 are both disposed about a central axis of the engine mount 14 that is approximately conforms to a principal elastic axis of the mount body 16, and are opposed to each other in the axial direction with the suitable axial spacing therebetween, while being elastically connected with each other by means of the rubber elastic body 22.

The rubber elastic body 22 has a large-diameter recess 36 with an inverted mortar-like shape, which is open in a large diameter end face of the rubber elastic body 22. The provision of the large-diameter recess 36 effectively reduces or prevents occurrence of tensile stress in the rubber elastic body 22 when a static load or weight of the power unit 10 or a vibrational load acts on the mount body 16 of the engine mount 14 installed on the vehicle as described above.

A rubber buffer 38, which is integrally formed with the rubber elastic body 22, is bonded to the stop plate 26 in the process of vulcanization of a rubber material for forming the rubber buffer 38, so as to extend axially upwardly from the stop plate 26. In operation, the stop plate 26 is brought into abutting contact with an abutting member (not shown) fixed to a member disposed on the side of the power unit 10 via the rubber buffer 38, for thereby limiting an amount of tensile elastic deformation of the rubber elastic body 22 when an excessively large load is applied in the direction along the principle axis of the mount body 16.

The large diameter end face of the rubber elastic body 22 is fluid-tightly held in abutting contact at its peripheral portion with an outer peripheral portion of the axially upper end face of the second mounting member 20. Thus, an opening of an upper circular recess 28 open in the upper end face of the second mounting member 20 and an opening of the large-diameter recess 36 are fluid-tightly closed with each other.

The upper circular recess 28 of the second mounting member 20 houses a movable member in the form of an oscillating rubber plate 40. The oscillating rubber plate 40 is a generally disk-shaped member whose central portion is slightly projected in the axially upward direction as seen in FIG. 2. A fixing ring 42 is bonded to an outer circumferential surface of the oscillating rubber plate 40 in the process of vulcanization of a rubber material for forming oscillating rubber plate 40. The fixing ring 42 is press-fitted into the upper circular recess 28 and fluid-tightly fixed to an axially lower end portion of the inner circumferential surface of the upper circular recess 28 such that the oscillating rubber plate 40 extends in a radial direction perpendicular to the principle elastic axis of the mount body 16, while being housed within the upper circular recess 28. A sealing lip, which does not appear in FIG. 2, is integrally formed at an outer peripheral portion of the oscillating rubber plate 40 so as to protrude axially downwardly, and is pressed onto the bottom surface of the upper circular recess 28 for assuring a fluid-tight sealing therebetween.

The upper circular recess 28 is divided by the oscillating rubber plate 40 housed therein as described above into axially opposite two sections, namely, a working air chamber 44 formed on the axially lower side of the oscillating rubber plate 40, and a primary fluid chamber 46 formed on the axially upper side of the oscillating rubber plate 40. The working air chamber 44 is fluid-tightly enclosed from the external area. The primary fluid chamber 46 is defined by and between the oscillating rubber plate 40 and the rubber elastic body 22, and is filled with a non-compressible fluid. An air passage 50 is formed through the second mounting member 20 such that the air passage 50 is open at one end thereof in an outer circumferential surface of the second mounting member 20 via a port 48, and extends radially inwardly through the second mounting member 20 to be open at the other end thereof in the bottom surface 31 of the upper circular recess 28. Namely, the working air chamber 44 is connectable to external air sources through the air passage 50. This arrangement makes it possible to apply a suitable periodic air pressure change to the working air chamber 44 through the air passage 50, thereby oscillating the oscillating rubber plate 40.

The upper circular recess 28 of the second mounting member 20 further houses a cap member 52. The cap member 52 is a thin disk-shaped metal member, and is press-fitted into the upper circular recess 28 with its peripheral portion fluid-tightly superposed on and bolted to a shoulder 29 formed in an inner circumferential surface of the upper circular recess 28, so that the cap member 52 is disposed within the upper circular recess 28 so as to extend in the radial direction perpendicular to the axial direction of the mount body 16. Consequently, the primary fluid chamber 46 is fluid-tightly divided into two sections, namely, a pressure receiving chamber 54 formed on the axially upper side of the cap member 52 and partially defined by the rubber elastic body 22, and an oscillating chamber 56 formed on the axially lower side of the cap member 52 and partially defined by the oscillating rubber plate 40. The pressure of the fluid in the pressure receiving chamber 54 changes due to deformation of the rubber elastic body 22 upon application of vibrations to the engine mount 14. On the other hand, the pressure of the fluid in the oscillating chamber 56 is actively changed as a result of oscillating displacement of the oscillating rubber plate 40 caused by the periodic air pressure change induced in the working air chamber 44.

To the lower surface of the cap member 52, a generally annular orifice member 58 is fixed. The orifice member 58 includes a circular groove 60 open in its axially upper end face and formed in its outer circumferential portion so as to extend circumferentially over a given circumferential distance. This orifice member 58 is press-fitted into the upper circular recess 28 of the second mounting member 20, thereby being assembled with the second mounting member 20. In this state, the opening of the circumferential groove 60 formed in the orifice member 58 is fluid-tightly closed by the inner circumferential surface of the second mounting member 20 and the cap member 52, thereby providing an orifice passage 62 defined between the orifice member 58 and the cap member 52 so as to extend circumferentially with a circumferential length that is made smaller than a circumference of the orifice member 58. One of circumferentially opposite ends of the orifice passage 62 is connected to the pressure receiving chamber 54, and the other end of the orifice passage 62 is connected to the oscillating chamber 56. Namely, the pressure receiving chamber 54 and the oscillating chamber 56 are held in fluid communication with each other via the orifice passage 62. Accordingly, the fluid pressure difference between the pressure receiving chamber 54 and the oscillating chamber 56 causes flows of the fluid through the orifice passage 62.

In the present embodiment, the orifice passage 62 is tuned so that the engine mount 14 can exhibit an excellent vibration isolating effect with the help of resonance or flows of the fluid through the orifice passage 62, with respect to vibrations over a medium frequency band including frequencies of engine idling vibrations. In this respect, the tuning of the orifice passage 62 can be achieved, for example, by changing the ratio, A/L, of cross-section area, A, to length, L of the orifice passage 62, while taking into account the density of the non-compressible fluid, the spring stiffness of the walls of the pressure receiving chamber 54 and the oscillating chamber 56, and the like.

As is understood from the foregoing description, the pressure receiving chamber 54 whose fluid pressure variation is directly induced by the elastic deformation of the elastic body 22, and the oscillating chamber 56 whose fluid pressure variation is indirectly effected by the elastic deformation of the elastic body 22 via the orifice passage 62, cooperate to form the primary fluid chamber 46 partially defined by the rubber elastic body 22 and the oscillating rubber plate 40.

On an axially lower side of the second mounting member 20 as seen in FIG. 2, a flexible diaphragm 64 is fixed. The flexible diaphragm 64 is formed of a thin rubber layer easily deformable, and is shaped into a bag-like configuration possessing a slack in its central portion, for permitting an easy deformation thereof. An annular fixing member 66 having an "L" shape in cross section is fixed to a peripheral portion of the flexible diaphragm 64 by vulcanization of a rubber material for forming the flexible diaphragm 64. This fixing member 66 is fitted onto and fixed to the outer peripheral portion of the lower end face of the second mounting member 20 by means of suitable fastening mechanism, e.g., by a plurality of bolts. Consequently, the opening of the lower circular recess 30 of the second mounting member 20 is fluid-tightly closed by the flexible diaphragm 64 so that the second mounting member 20 and the flexible diaphragm 64 cooperate to define therebetween an equilibrium chamber 70 filled with the non-compressible fluid. Elastic deformation or displacement of the flexible diaphragm 64 permits easy change in the volume of the equilibrium chamber 70, thus preventing undesirable fluid pressure variation in the equilibrium chamber 70 as much as possible.

The second mounting member 20 is further formed with an axial passage 72 that is located in the radially outer portion of the upper circular recess 28 and extends through the second mounting member 20 in the axial direction. The axial passage 72 is connected at its one end thereof to the pressure receiving chamber 54, and at the other end thereof to the equilibrium chamber 70, for thereby functioning as a fluid passage 74 and permitting a fluid communication between the pressure receiving chamber 54 and the equilibrium chamber 70. Therefore, pressure difference between the pressure receiving chamber 54 and the equilibrium chamber 70 causes flows of the fluid through the fluid passage 74 between these two chambers 54, 70. In the present embodiment, the fluid passage 74 is tuned so that the engine mount can exhibit an excellent vibration damping effect with the help of resonance or flows of the fluid through the fluid passage 74, with respect to vibrations over a low frequency band that includes frequencies of the engine shakes and other low frequencies required to be damped by this vibration damping support mechanism. The tuning of the fluid passage 74 can be achieved by the same manner as described above with respect to the orifice passage 62.

The filling of the pressure receiving chamber 54, the oscillating chamber 56 and the equilibrium chamber 70 with the non-compressible fluid may be effectively accomplished by assembling the rubber elastic body 22 and the flexible diaphragm 64 with the second mounting member 20 within a mass of the non-compressible fluid. The non-compressible fluid may be selected from among water, alkylene glycol, polyalkylene glycol and silicone oil, for example. For assuring the present engine mount 14 to exhibit an excellent damping effect based on resonance of the fluid through the orifice passage 62 and the fluid passage 74, it is preferable to select fluids having a viscosity of not higher than 0.1 Pa·s.

The mount body 16 constructed as described above is interposed between the power unit 10 and the body 12 of the vehicle, as shown in FIG. 1. Namely, the first mounting member 18 is bolted to the power unit 10 while the second mounting member 20 is bolted to the body 12 via a suitable bracket or the like. With the mount body 16 installed in position as described above, a pressure transmitting conduit 76 is connected to the port 48 of the mount body 16. The pressure transmitting conduit 76 may be a tubular conduit formed of a rigid resin material or metal, and permits via the port 48 a communication between the working air chamber 44 and a vacuum pump 78 as a component of an air source.

Any vacuum pump may be employed as the vacuum pump 78 as long as it is capable of electrically controlling its output characteristics by a suitable electric signal, and it is capable of providing an available positive pressure on the exhaust side as well as an available negative pressure on the air intake side. Preferably, a diaphragm type dry vacuum pump or the like may be employed, since the dry vacuum pump is operated by an electric motor. In FIG. 1, the reference numeral 98 donates a power source for driving the vacuum pump 78.

A negative pressure conduit 80 is connected to an air intake port of the vacuum pump 78, while a positive pressure conduit 82 is connected to an exhaust port of the vacuum pump 78. These negative and positive pressure conduits 80, 82 are connected to a negative pressure port 86 and a positive pressure port 88 of a first three-way valve in the form of a three-way valve 84 of electromagnetically operated type or solenoid operated type, which functions as a valve mechanism. The last port 90 of the three-way valve 84 is connected to the pressure transmitting conduit 76 that is connected to the working air chamber 44 of the mount body 16. That is, the port 90 of the three-way valve 84 functions as an output port.

The three-way valve 84 has a first position for connecting the output port 90 to the negative pressure port 86, and a second position for connecting the output portion 90 to the positive pressure port 88. The three-way valve 84 can be operated under control of a valve controller 92 so that the output port 90 is selectively and alternately connected to the negative pressure port 86 and the positive pressure port 88, by switching operations of the three-way valve 84 between the first and second positions. That is, the switching operation of the three-way valve 84 makes it possible to alternately apply the negative and positive pressures generated in the vacuum pump 78 to the working air chamber 44 of the mount body 16. As is understood from the foregoing description, the pressure transmitting conduit 76, the negative pressure conduit 80 and the positive pressure conduit 82 cooperate to form an air conduit serving for applying air pressure variation to the working air chamber 44 of the mount body 16 from the external area.

According to the present embodiment, a negative pressure tank 94 is connected to a portion of the negative pressure conduit 80, while a positive pressure tank 96 is connected to a portion of the positive pressure conduit 82. A variety of accumulators may be employed as the negative pressure tank 94 and the positive pressure tank 96. Preferably, an accumulator equipped with a pressure regulating mechanism utilizing a pressure regulating valve or the like for adjusting a pressure value may be employed. The use of this accumulator as the negative and positive pressure tanks 94, 96, makes it possible to keep the values of the negative and positive pressures applied to the ports 86, 88 substantially constant, even if the vacuum pump 78 is continuously operated. In addition, the use of the accumulators as the negative and positive pressure tanks 94, 96 effectively avoids that the vacuum tank 78 is undue burdened. These pressure regulating mechanisms may be disposed on the negative pressure tank 94, the positive pressure tank 96, the negative pressure conduit 80 and the positive pressure conduit 82, as well.

The valve controller 92 is not specifically limited so long as it is able to suitably adjust the air pressure variation applied to the working air chamber 44 of the mount body 16 depending upon running conditions of the vehicle so that the engine mount 14 can exhibit an excellent vibration damping effect with respect to vibrations to be damped. For the case where the engine mount 14 is expected to exhibit active vibration damping effects for the engine idling vibrations, it is preferable to employ as a reference signal an ignition pulse signal generated from an internal combustion engine, since the ignition pulse signal has a frequency corresponding to that of the engine idling vibrations and a phase having a predetermined relationship with respect to that of the engine idling vibrations. When the ignition pulse signal is employed as the reference signal, an electric current applied to an electromagnetic coil of the three-way valve 84 is adequately controlled based on the ignition pulse signal for assuring a desired switching operation of the three-way valve 84, namely, the three-way valve 84 is operated at a frequency corresponding to that of the ignition pulse signal so as to apply the air pressure variation whose frequency is substantially equal to that of the ignition pulse signal to the working air chamber 44. Further, a phase difference between the vibrations to be damped (i.e., the engine idling vibrations) and the reference signal is actually measured depending on an engine speed of the internal combustion engine or a running condition of a vehicle, and a desired phase of the switching operation of the three-way valve 84 with respect to the reference signal is determined according to a data map or an operation formula prepared in advance. Accordingly, the electric current applied to the electromagnetic coil of the three-way valve 84, whose frequency is determined as described above, is also controlled on the basis of the phase determined as described above.

According to the engine mount 14 constructed as described above, the working air chamber 44 of the mount body 16 is alternately subjected to the negative pressure available on the side of the air intake port of the vacuum pump 78 and the positive pressure available on the side of the exhaust port of the vacuum pump 78, by the switching operation of the three-way valve 84. As a result, the air pressure variation within a range between a value of the negative pressure provided on the side of the air intake port of the vacuum pump 78 and a value of the positive pressure provided on the side of the exhaust port of the vacuum pump 78, is applied to the working air chamber with the frequency and the phase corresponding to those of vibrations to be damped. The air pressure variation applied to the working air chamber 44 acts as an oscillating force on the oscillating rubber plate 40, thereby causing a pressure variation in the oscillating chamber 56, which corresponds to the vibrations to be damped The thus caused pressure variation in the oscillating chamber 56 is transmitted to the pressure receiving chamber 54 through the orifice passage 62, thereby actively controlling the pressure of the fluid in the pressure receiving chamber 54, ensuring the engine mount 14 to exhibit a desired active vibration damping effect.

Figure 3:
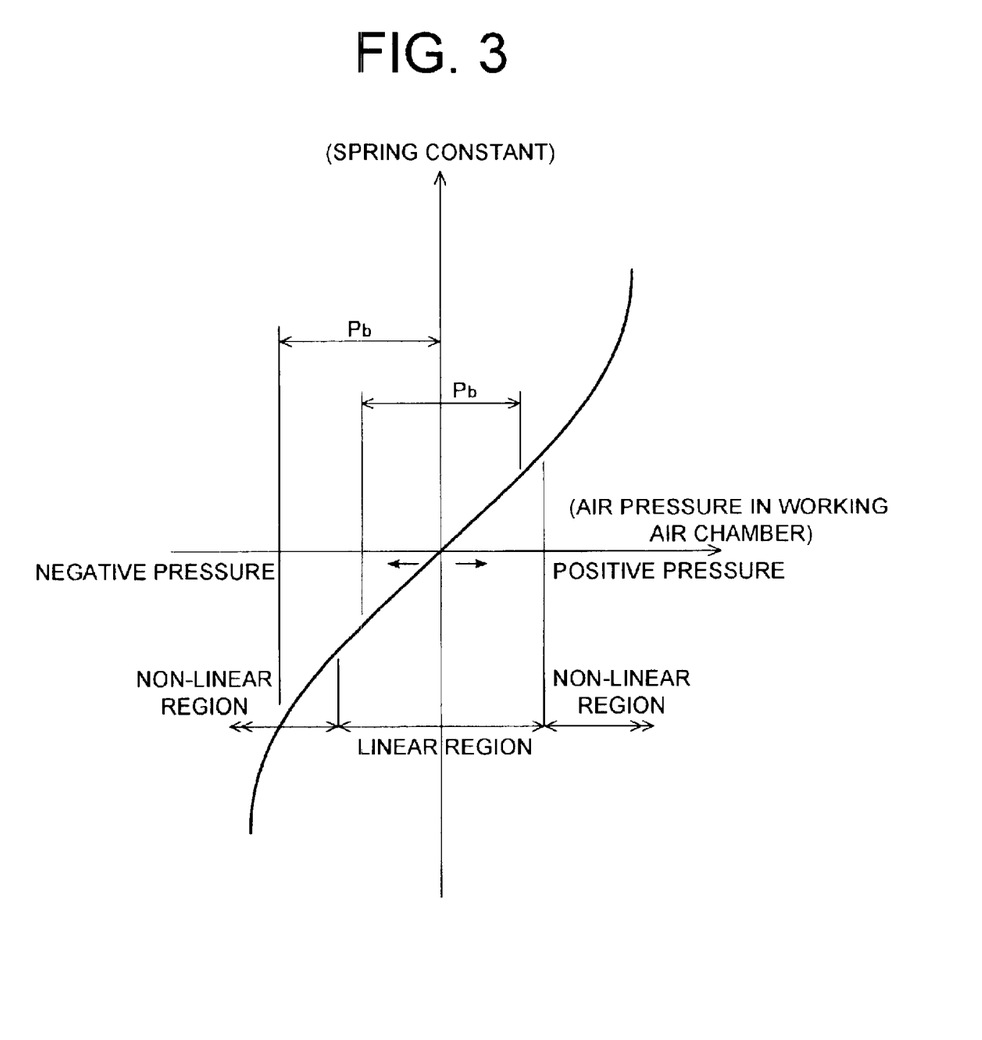
FIG. 3 is a graph suitable for explaining operation of the engine mount of FIG. 1.

The graph of FIG. 3 shows amplitude characteristics of the pressure variation induced in the working air chamber 44 of the mount body 16 of the engine mount 14 constructed according to the present invention. As is apparent from the graph of FIG. 3, the pressure variation induced in the working air chamber 44 has a central pressure value set to about the atmospheric pressure, and is decreased and increased to the negative and positive pressure sides by the approximately same magnitude. Accordingly, the pressure in the working air chamber 44 varies by a magnitude "Pb" as indicated by allows in the graph of FIG. 3. Consequently, the oscillating rubber plate 40 is displaced reciprocatively or upward and downward from its central position, i.e., its neutral position where no external force applied thereto, due to the application of the periodic air pressure variation. This arrangement makes it possible to more efficiently apply the air pressure variation to the working air chamber 44 by means of the vacuum pump 78, in comparison with the case where the working air chamber is alternately subjected to the negative pressure and the atmospheric pressure The resultant large magnitude of the air pressure variation induced in the working air chamber 44 permits the engine mount 14 to exhibit a high active vibration damping effect with respect to vibrations having large magnitude or energy.

When the oscillating rubber plate 40 is elastically displaced back and force from its central or neutral position in its wall-thickness direction due to the periodic air pressure variation applied to the working air chamber 44, the oscillating rubber plate 40 experiences a change of its spring constant along with the air pressure variation induced in the working air chamber 44. As is understood from the graph of FIG. 3, the elastic displacement of the oscillating rubber plate 40 is set to a central portion of a linear region of the change of the spring constant of the oscillating rubber plate 40 with respect to the air pressure variation in the working air chamber 44, where the spring constant of the oscillating rubber plate 40 changes linearly. As shown in the graph of FIG. 3, if an air pressure variation having the same magnitude "Pb" is generated between the negative pressure and the atmosphere, for example, the range of displacement of the oscillating rubber plate 40 cannot be held within the linear region and extends to a non-linear region located outside the linear region, where the spring constant of the oscillating rubber plate 40 varies with non-linear characteristics. The mount body 16 constructed according the present embodiment, however, makes it possible to limit the elastic displacement of the oscillating rubber plate 40 within the linear region of the change of the spring constant of the oscillating rubber plate 40. In other words, since the oscillating rubber plate 40 is elastically displaced within the linear region of the change of its spring constant, the relationship between the air pressure variation applied to the working air chamber 44 and the fluid pressure variation transmitted from the oscillating chamber 56 to the pressure receiving chamber 54 via the oscillating rubber plate 40 is made linear, thereby generating a relatively large magnitude of pressure variation in the pressure receiving chamber 54 efficiently. This arrangement also minimizes undesirable occurrence of pressure variation at a subordinate frequency range when the pressure variation is transmitted from the oscillating chamber 56 to the pressure receiving chamber 54, thereby permitting the engine mount 14 to exhibit a desired active vibration damping effect with further improved stability and efficiency.

In the present embodiment, the pressure variation induced in the oscillating chamber 56 is amplified and transmitted to the pressure receiving chamber 54 with the help of the resonance of the fluid flowing through the orifice passage 62, whereby the engine mount 14 can exhibit an active vibration isolating effect with respect to idling vibration as a result of fluid pressure control of the pressure receiving chamber 54 with high efficiency.

Further, the engine mount 14 constructed according to the present embodiment can exhibit a passive vibration damping effect with respect to low frequency vibrations, e.g., the engine shakes, with the help of the resonance of the fluid flowing between the pressure receiving chamber 54 and the equilibrium chamber 70 through the fluid passage 74 that is tuned to the low frequency vibrations.

Another advantage of the present embodiment is that the engine mount 14 makes it easy to provide a unit of active vibration damping device including an air pressure source in the form of the vacuum pump 78 and an air conduit.

Figure 4:
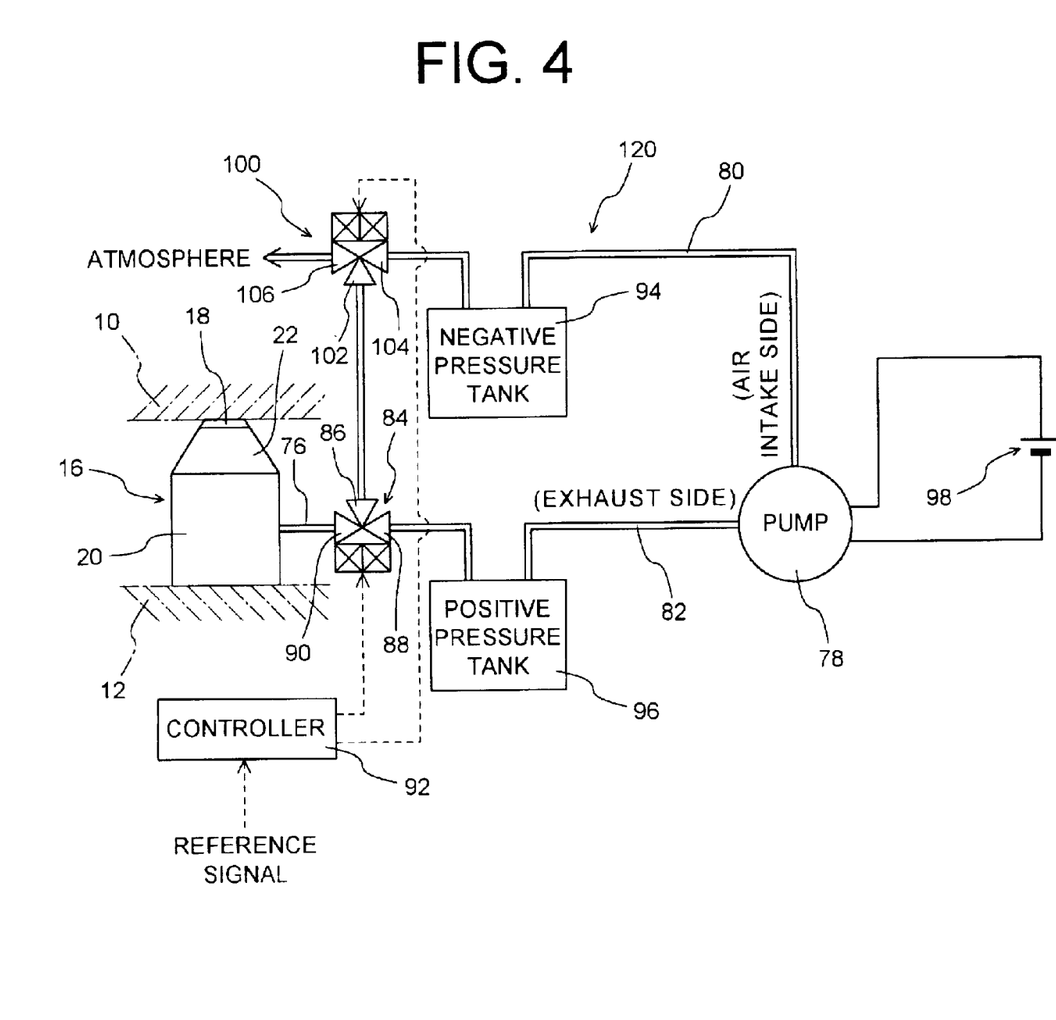
FIG. 4 is a diagram schematically illustrating a fluid-filled active vibration damping device in the form of an engine mount constructed according to a second embodiment of the present invention.
Figure 5:
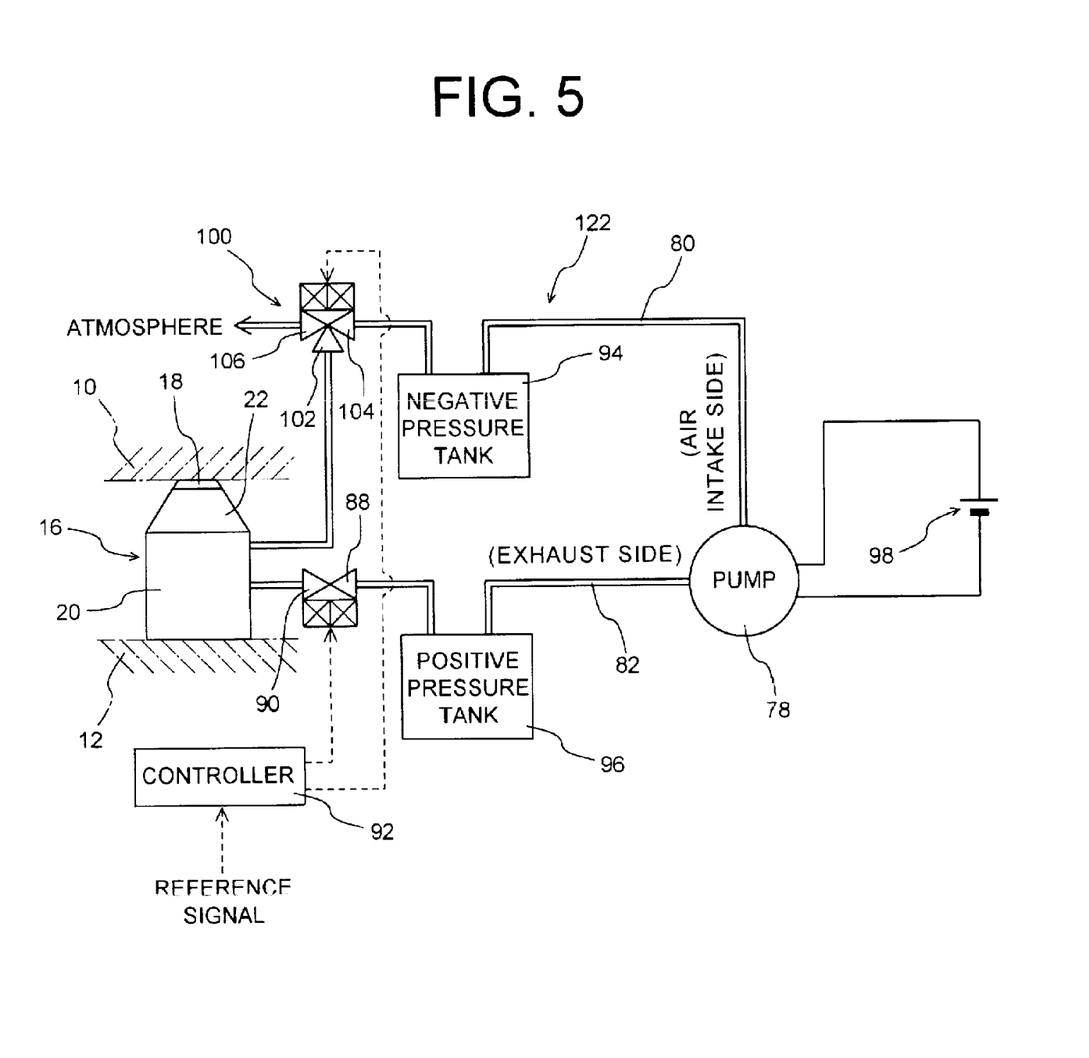
FIG. 5 is a diagram schematically illustrating a fluid-filled active vibration damping device in the form of an engine mount constructed according to a third embodiment of the present invention.
Figure 6:
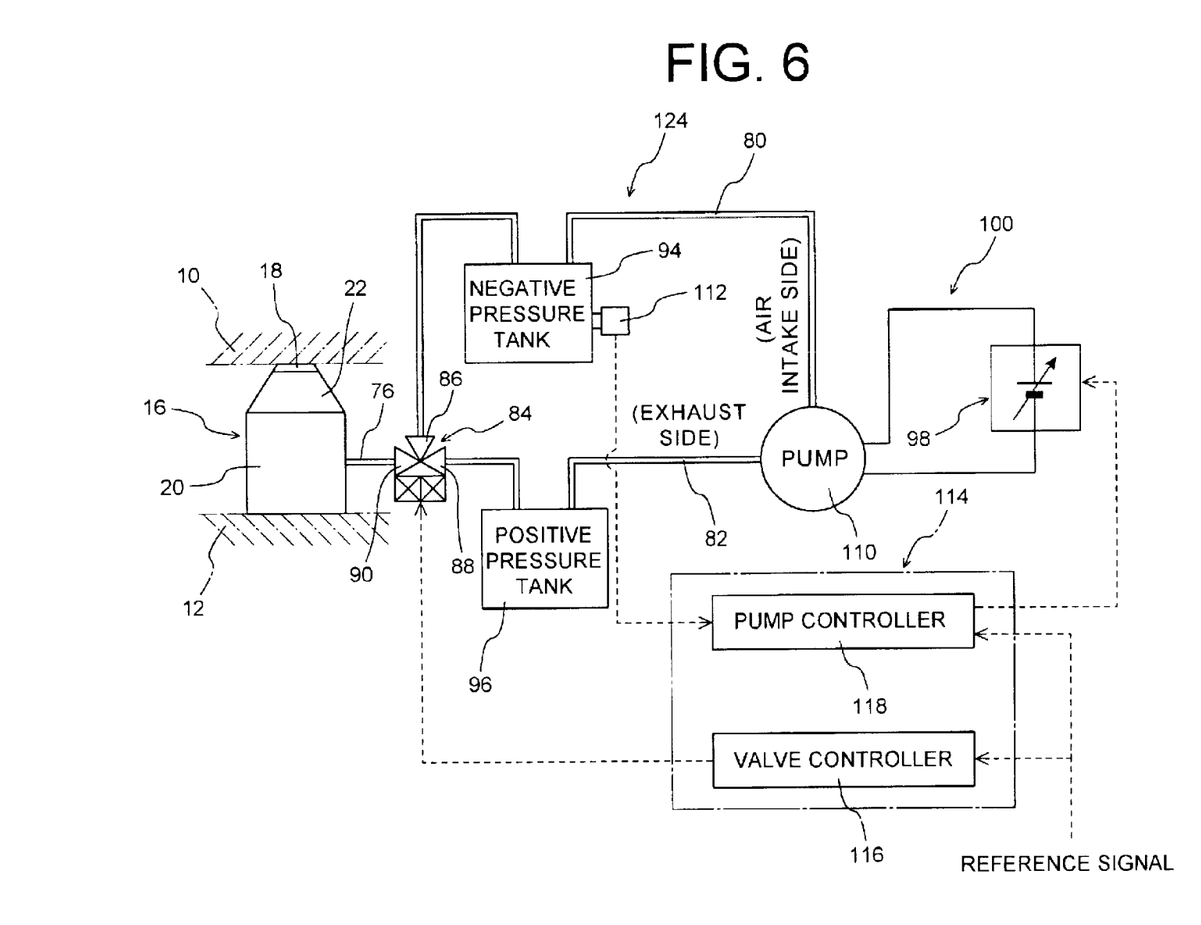
FIG. 6 is a diagram schematically illustrating a fluid-filled active vibration damping device in the form of an engine mount constructed according to a fourth embodiment of the present invention.

Referring next to FIGS. 4–6, there are shown engine mounts constructed according to second, third and fourth embodiments of the present invention. The same reference numerals as used in the first embodiment will be used in the second, third and fourth embodiments to identify the structurally or functionally corresponding components, and no redundant description of these components will be provided.

FIG. 4 shows the engine mount 120 constructed according to the second embodiment of the present invention, where a second three-way valve in the form of an atmosphere-opening valve 100 consists of a three-way valve of electromagnetic type is connected to a portion of the negative conduit 80 located between the negative pressure tank 94 and the three-way valve 84. The atmosphere-opening valve 100 has a first position for connecting an output port 102, which is connected to the working air chamber 44 via the three-way valve 84, to a negative pressure port 104 connected to the vacuum tank 94, and a second position for connecting the output port 102 to an atmospheric pressure port 106 connected to the atmosphere. The atmosphere-opening valve 100 can be operated under control of the valve controller 92 so that the output port 102 is selectively connected to the negative pressure port 104 and the atmospheric pressure port 106, by switching operation of the atmosphere-opening valve 100 between the first and second positions.

The engine mount 120 constructed according to the present embodiment makes it possible to neutralize or reset the air pressure in the working air chamber 44 by exposing the working air chamber 44 to the atmosphere before the engine mount 16 starts its active vibration damping control, for example. This permits the engine mount 120 to induce in the working air chamber 44 the air pressure variation with the generally central value of the atmospheric pressure like in the first embodiment, with high stability, resulting in further improved stability of the active vibration damping effect of the engine mount 120.

Alternatively, the atmosphere-opening valve 100 may be operated to be switched between the first and the second position at a frequency sufficiently higher than the frequency of the switching operation of the three-way valve 84, according to a pulse duration (width) modulation (PWM) control so that the level of the negative pressure applied to the negative pressure port 86 of the three-way valve 84 is regulated. In this case, preferably, the negative pressure applied to the negative pressure port 86 of the three-way valve 84 is preferably regulated by controlling the duty ratio of the atmosphere-opening valve 100, i.e., a ratio of a time in which the atmosphere-opening valve 100 is held in first or second position, i.e., is held in connected with the negative pressure tank 94 or the atmosphere, to the entire period of the switching operation of the atmosphere-opening valve 100.

FIG. 5 shows an engine mount 122 constructed according to the third embodiment of the present invention, where the output port 102 of the atmosphere-opening valve 100 is directly connected to the working air chamber 44 of the engine mount 16 via the negative pressure conduit 80 but not via the positive pressure conduit 82, unlike the engine mount 120 according to the second embodiment.

The engine mount 122 constructed according to the present embodiment can enjoy the same advantages of the present invention as described above with respect to the second embodiment of the present invention. It should be noted that the engine mount 122 of the present embodiment makes it possible to completely separate the negative and positive pressure conduits 80, 82 from each other.

The engine mount 122 constructed according to the third embodiment may otherwise be modified. For instance, the atmosphere-opening valve 100 may be replaced by a shut-off valve of electromagnetic type so as to control only alternative connection and disconnection of the working air chamber 44 to and from the negative pressure tank 94, while eliminating the connection of the working air chamber 44 to the atmosphere. In this case, a two-way or a two-port type electromagnetic shut-off valve may be connected to the negative pressure conduit 80 and the positive pressure conduit 82, without using any three-way valve, thereby making it possible to control the air pressure variation induced in the working air chamber 44. These two electromagnetic shut-off valves constitute the valve mechanism in this modification.

FIG. 6 shows the engine mount 124 constructed according to the fourth embodiment, where the operation of the engine mount 124 is controlled according to a manner different from that employed in the engine mount 14 of the first embodiment. In the engine mount 124, a variable type vacuum pump 110 is employed as a vacuum pump, unlike the engine mount 14 of the first embodiment. The vacuum pump 110 is capable of changing its output value of the air pressure by changing an electric signal or power applied thereto. Further, a pressure sensor 112 is attached to the negative pressure tank 94, in order to detect a value of the negative pressure in the negative pressure tank 94. A controller 114 controls the operation of the vacuum pump 110 on the basis of the actual measurements of the negative pressure in the negative pressure tank 94 by the pressure sensor 112, in a feedback control manner, so that the output negative pressure and the positive pressure of the vacuum pump 110 have respective desired values.

The controller 114 includes a valve controller 116 functioning as a valve controlling device and a pump output control device in the form of a pump controller 118 functioning as a control device for regulating output values of a pump. The valve controller 116 adapted to control the switching operation of the three-way valve 84 based on the reference signal such as the ignition pulse signal of the internal combustion engine that corresponds to the vibrations to be damped, such that the three-way valve 84 performs its switching operation at a frequency and a phase corresponding to the frequency and the phase of the vibrations to be damped, so that an air pressure variation having a frequency and a phase that correspond to the frequency and the phase of the vibrations to be damped is induced in the working air chamber 44 of the mounting body 16. On the other hand, the pump controller 118 is adapted to regulate output values of the negative and positive pressures generated from the vacuum pump 110 based on the reference signal such as the ignition pulse signal of the internal combustion engine that corresponds to the vibrations to be damped, while utilizing a data map representing a relationship between actual measurements of the engine speed of the internal combustion engine and the magnitude of the vibrations to be damped, or a predetermined operation formula, so that an air pressure variation whose magnitude corresponds to that of the vibrations to be damped is induced in the working air chamber 44 of the mounting body 16.

The engine mount 124 constructed according to the present embodiment is capable of directly controlling or regulating the magnitudes of the negative and the positive pressures generated in the vacuum pump 110, thus eliminating a need for regulating the air pressure at a portion of the air conduit located between the vacuum pump 110 and the mount body 16, e.g., by controlling the duty ratio of a switch valve connected to a portion of the air conduit. This makes it easy to control such a switch valve disposed on the air conduit provided between the vacuum pump 110 and the mount body 16, and makes it possible to control the duty ratio of the switch valve so as not to generate higher harmonics of the frequency of the switching operation of the switch valve (three-way valve 84).

While the engine mount 124 constructed according to the fourth embodiment of the present invention utilizes the air pressure variation control mechanism including the vacuum pump 110 whose output value is variable and the pump controller 118, this control mechanism is similarly applicable to the engine mounts 14, 120, 122 constructed according to the first through third embodiments. In the engine mount 124, the pressure sensor 112 is attached to the negative pressure tank 94 for the sake of simplicity in its sealing structure, it may be possible to fix the pressure sensor to the positive pressure tank 96 in replace of or in addition to the negative pressure tank 94. Alternatively, the feedback control is not necessarily required, if the operation of the vacuum pump 110 is sufficiently accurately controllable, and it may be possible to control an application of an electric current to the vacuum pump 110 in an open-loop fashion, so that the vacuum pump 110 generates a desired air pressure that is determined depending upon engine speeds or the like.

While the presently preferred embodiments of the invention has been described above for illustrative purpose only, it is to be understood that the invention is not limited to the details of the illustrated embodiments, but may be otherwise embodied.

For instance, the present invention is applied to the engine mounts for use in an automotive vehicle, in the illustrated embodiments, the principle of the present invention may also be applicable to a body mount, a suspension bushing or other vibration damping couplings or supports for use in various kinds of devices other than the automotive vehicle.

The principle of the present invention may be similarly applicable to an active dynamic damper that is installed on a member whose vibrations to be damped to exhibit a desired damping effect with respect to vibrations excited in the member. Such an active dynamic damper may be provided, for example, such that the first mounting member 18 of the engine mount according to any one of the first through fourth embodiments is fixed to the body or other members of the vehicle whose vibrations to be damped, while the second mounting member 20 is permitted to be freely displaced. Thus, the active dynamic damper having the rubber elastic body 22 functioning as a spring system and the second mounting member 20 functioning as the mass system can be provided.

While the primary fluid chamber 46 is divided into the oscillating chamber 56 and the pressure receiving chamber 54 which are held in fluid communication with each other through the orifice passage 62 in the illustrated embodiment, this arrangement is not essential to practice the present invention, but may be possible to provide a vibration damping device of the present invention with a single fluid chamber, e.g., with the primary fluid chamber 46 that is not divided into the two sections as described above.

Likewise, the fluid passage 74 and the equilibrium chamber 70 connected to the primary fluid chamber 46 may be optionally employed depending upon required vibration damping characteristics of the engine mount, and these are not essential to practice the present invention, either.

The negative pressure tank 94 and the positive pressure tank 96 disposed on the negative pressure conduit 80 and the positive pressure conduit 82 are not essential to practice the present invention, but may be optionally employed taking into account of characteristics of the vacuum pump, the required vibration damping characteristics of the engine mount, vibrations to be damped, and the like.

It is also to be understood that the present invention may be embodied with various other changes, modifications and improvements, which may occur to those skilled in the art, without departing from the spirit and scope of the invention defined in the following claims

What is claimed is:

1. A fluid-filled active vibration damping device comprising:

an elastic body elastically deformed due to vibrational loads applied thereto;

a primary fluid chamber partially defined by said elastic body and filled with a non-compressible fluid;

a movable member being elastically displaceable and partially defining said primary fluid chamber on one of opposite sides thereof;

a working air chamber disposed on other one of opposite sides of said movable member, which is remote from said primary fluid chamber; and a vacuum pump including an air intake port and an exhaust port that are connected to said working air chamber via a valve mechanism, wherein a fluid pressure variation in said primary fluid chamber is induced by an elastic deformation of said elastic body while being actively controlled by transmitting an air pressure variation applied to said working air chamber from an external area to said primary fluid chamber via said movable member, and wherein said valve mechanism is operable to perform a switching operation thereof for selectively applying a negative pressure generated in said air intake port and a positive pressure generated in said exhaust port to said working air chamber in order to generate said air pressure variation in said working air chamber ranging over opposite sides of an atmospheric pressure as a substantially central value of the variation.

2. A fluid-filled active vibration damping device according to claim 1, wherein said working air chamber is connectable to an atmosphere via said valve mechanism, and said negative pressure generated in said air intake port, said positive pressure generated in said exhaust port and an atmospheric pressure in said atmosphere are selectively applied to said working air chamber based on said switching operation of said valve mechanism.

3. A fluid-filled active vibration damping device according to claim 1, wherein said valve mechanism includes a first three-way valve that is operable to alternately connect said working air chamber to said negative pressure generated in said air intake port, and said positive pressure generated in said exhaust port.

4. A fluid-filled active vibration damping device according to claim 1, further comprising a negative pressure tank connected to a portion of an air conduit located between said air intake port of said vacuum pump and said valve mechanism, and a positive pressure tank connected to another portion of said air conduit located between said exhaust port of said vacuum pump and said valve mechanism.

5. A fluid-filled active vibration damping device according to claim 1, further comprising a valve controller for controlling operation of said valve mechanism such that said valve mechanism alternately connects said working air chamber to said negative pressure generated in said air intake port and said positive pressure generated in said exhaust port at a frequency corresponding to that of vibrations to be damped, for generating said air pressure variation in said working air chamber.

6. A fluid-filled active vibration damping device according to claim 1, wherein said vacuum pump comprises a vacuum pump of electromagnetically operated type, said vibration damping device further comprising: a pump output control device adapted to regulate an output of said vacuum pump of electromagnetically operated type depending upon magnitude of vibrations to be damped.

7. A fluid-filled active vibration damping device according to claim 1, further comprising a pump synchronizing control device adapted to regulate a frequency and a phase of a variation of air pressure generated from said vacuum pump according to a frequency and a phase of vibrations to be damped.

8. A fluid-filled active vibration damping device according to claim 1, wherein said primary fluid chamber includes a pressure receiving chamber partially defined by said elastic body and an oscillating chamber partially defined by said movable member, said pressure receiving chamber and said oscillating chamber are held in fluid communication with each other via an orifice passage.

9. A fluid-filled active vibration damping device according to claim 1, further comprising: a flexible layer partially defining an auxiliary fluid chamber being independent of said primary fluid chamber and filled with said non-compressible fluid; and a fluid passage for permitting a fluid communication between said primary fluid chamber and said auxiliary fluid chamber.

10. A fluid-filled active vibration damping device according to claim 1, further comprising a first mounting member and a second mounting member that are elastically connected with each other via said elastic body, wherein said first mounting member is adapted to be attached to a vibrative member and said second mounting member is adapted to be attached to a subject member whose vibrations to be damped so that said vibration damping device is interposed between the vibrative member and the subject member for elastically connecting the vibrative member and the subject member in a vibration damping fashion.

11. A fluid-filled active vibration damping device according to claim 1, further comprising a support member and a mass member that are elastically connected with each other via said elastic body, said support member being adapted to attached to a subject member whose vibrations to be damped such that said mass member is elastically supported by the subject member via said elastic body.

12. A fluid-filled active vibration damping device according to claim 1, wherein said valve mechanism comprises a first three-way valve having a negative pressure port, a positive pressure port and an output port, and an air conduit includes a negative pressure conduit connecting between said negative pressure port and said air intake port of said vacuum pump, a positive pressure conduit connecting between said positive pressure port and said exhaust port of said vacuum pump, and a pressure transmitting conduit connecting between said output port and said working air chamber, said vibration-damping device further comprising a negative pressure tank connected to a portion of said negative pressure conduit, a positive pressure tank connected to a portion of said positive pressure conduit, and a valve controller for controlling a switching operation of said first three-way valve such that said output port is alternately connected to said negative pressure port and said positive pressure port at a frequency and a phase corresponding to those of vibrations to be damped.

13. A fluid-filled active vibration damping device according to claim 12, further comprising a second three-way valve connected to a portion of said negative pressure conduit located between said negative pressure tank and said first three-way valve, and having a negative pressure port connected to said negative pressure tank, an atmospheric pressure port connected to an atmosphere and an output port connected to said negative pressure port of said first three-way valve, wherein said second three-way valve is operable to selectively connect said output port thereof to said negative pressure port thereof and said atmospheric pressure port thereof.

14. A fluid-filled active vibration damping device according to claim 13, wherein a switching operation of said second three-way valve is performed at a frequency sufficiendy higher than said frequency at which said first three-way valve is operated for regulating a value of said negative pressure applied to said negative pressure port of said first three-way valve.

15. A fluid-filled active vibration damping device according to claim 12, further comprising a second three-way valve connected to a portion of said negative pressure conduit located between said negative pressure tank and said working air chamber, and having a negative pressure port connected to said negative pressure tank, an atmospheric pressure port connected to an atmosphere and an output port connected to said working air chamber via said negative pressure conduit.

16. A fluid-filled active vibration damping device according to claim 12, further comprising a pressure sensor adapted to detect a pressure value in said negative pressure tank and/or said positive pressure tank, and a pump output control device, wherein said vacuum pump comprises a vacuum pump of electromagnetically operated type, and said pump output control device controls an output of said vacuum pump based on said pressure value detected by said pressure sensor in a feedback control fashion.

17. A fluid-filled active vibration damping device according to claim 1, wherein the movable member undergoes elastic displacement in a linear region where the moveable member shows linear characteristics in a relationship between an applied load and a resultant spring constant thereof.

* * * * *